UNITED STATES PATENT OFFICE.

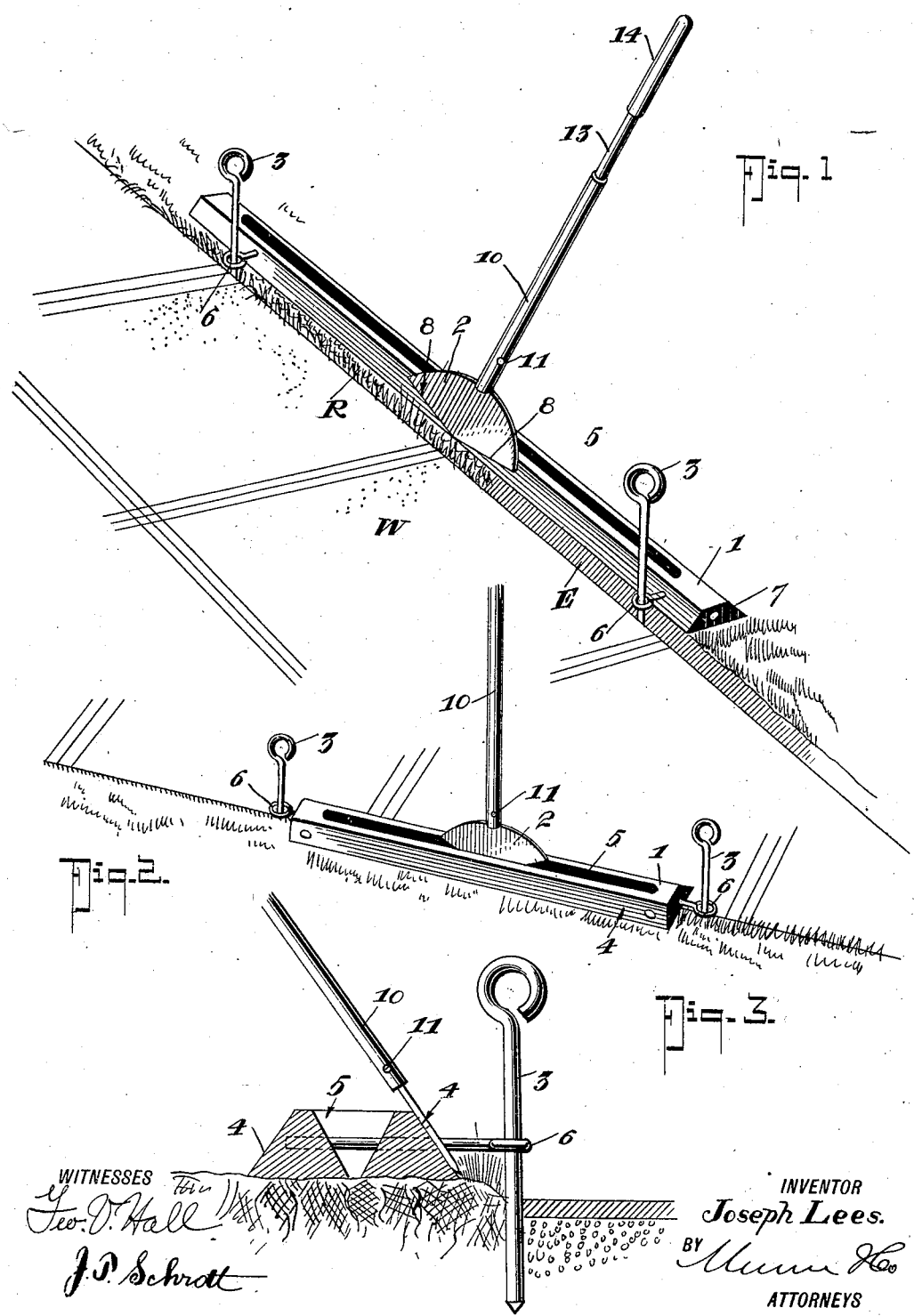

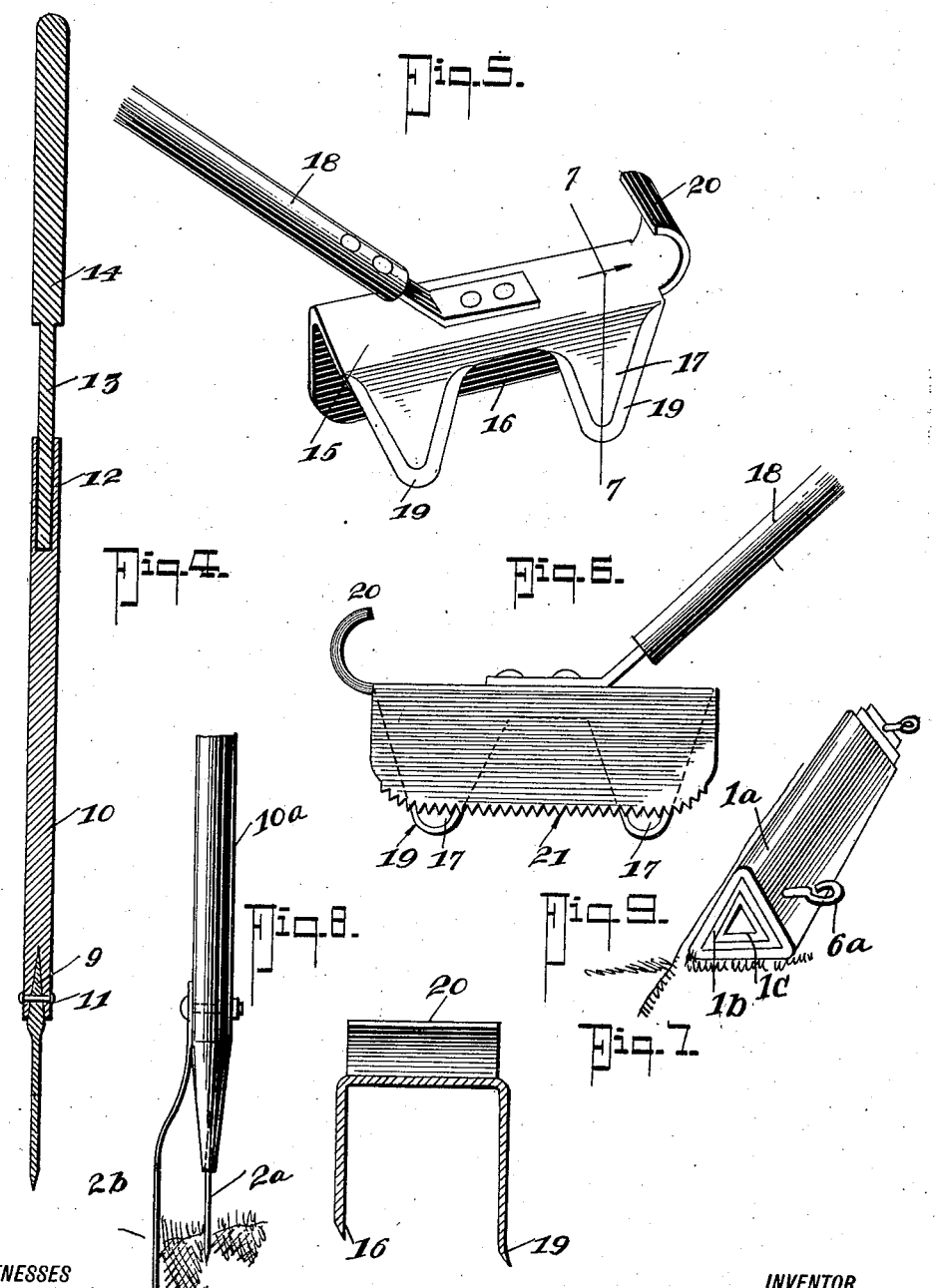

JOSEPH LEES, OF WEST BETHLEHEM, PENNSYLVANIA.

LAWN-EDGE-TRIMMING GAGE.

1,343,269. Specification of Letters Patent. Patented June 15, 1920.

Application filed November 15, 1919. Serial No. 338,180.

*To all whom it may concern:*

Be it known that I, JOSEPH LEES, a citizen of the United States, and a resident of West Bethlehem, in the county of Lehigh and State of Pennsylvania, have invented certain new and useful Improvements in Lawn-Edge-Trimming Gages, of which the following is a specification.

My invention relates to improvements in gages, it being more particularly an improvement in gages for trimming lawns along the edges adjacent to a walk, and it consists in the constructions, combinations and arrangements herein described and claimed.

The foremost object of my invention is to provide a gage bar of metal construction, which can be pinned along the edge of a walk so that a cutting implement can be used in connection therewith in trimming off the turf in a smooth and even manner.

A further object of the invention is to provide a gage for the purpose described, which is adjustable in respect to the edge of a walk, so that edges of various widths can be trimmed off the adjacent ground.

A still further object of the invention is to provide an improved cutting implement to be used in connection with the cutting gage above described.

A still further object of the invention is to provide a cutting implement for trimming the edge of a lawn adjacent to a walk, without the use of the improved gage bar above referred to.

Other objects and advantages will appear in the following specification, reference being had to the accompanying drawings, in which:—

Figure 1 is a perspective view showing the improved gage bar pinned in place, and the improved cutting implement, to be used in connection therewith, applied as in use, Fig. 2 is a detail perspective view showing how the central longitudinal slot in the gage bar is to be used in trimming off the edge of the lawn, Fig. 3 is a detail cross section referred to hereinafter, Fig. 4 is a longitudinal section of the improved cutting implement in Fig. 1, Fig. 5 is a detail perspective view of an improved cutting implement to be used without the gage bar for cutting curved edges, Fig. 6 is a side elevation thereof, showing a modification in which a saw tooth edge is employed, Fig. 7 is a detail cross section taken substantially on the line 7—7 of Fig. 5, Fig. 8 is a further modification of the turf cutter illustrated in Fig. 4, and Fig. 9 is a further modification of the gage, wherein telescopic members are employed.

By way of introduction, it may be stated that the operation of trimming the edge of a lawn adjacent to a walk is always laborious and can be accomplished only with partial satisfaction so far as appearances, after the work is done, are concerned. An otherwise attractive lawn is spoiled in appearance by a rough and jagged edge, and it is the purpose of the invention, as defined in the foregoing description of the objects, to make it easy to trim off this rough edge so that a uniform and pleasing appearance is presented.

Consider now Fig. 1. The gage bar 1 is made of metal or any desired material, in a length of perhaps ten feet, so that the blade 2 of the improved cutting implement, may be moved along a considerable distance before it becomes necessary to remove the pins or stakes 3 for a readjustment of the gage bar. Or if it be desired, the gage bar may be made of a plurality of sections of triangular tubing, each successively smaller so that the whole may be telescoped into a length of approximately 3 or 4 feet. The gage bar is beveled at 4 on opposite sides, and has a longitudinal slot 5 tapering downwardly to a relatively narrow slit at the bottom, as clearly shown in Fig. 3.

Screw eyes 6 are screwed into one of the beveled surfaces 4, so as to assume a horizontal position when the gage bar is laid on the grass adjacent to the edge of the walk W. These screw eyes can be screwed in or out as far as desired and act as limiting means so far as the position of the gage bar in respect to the edge of the walk, is concerned.

Should a wide trimmed edge B be desired, the screw eyes 6 are screwed relatively far out, and conversely, should a narrow edge be desired, they are screwed in. The stakes are inserted in the eyes of the screws and pushed into the ground close up to the edge of the walk. The walk therefore is used as the fixed means in reference to which the gage bar is positioned. The gage bar having been fixed in place, as shown in Fig. 1, the cutting implement 2 is moved along, the rough edge R is cut away, leaving a smooth, clean-cut beveled edge E between the grass and the walk.

It is to be observed that the screw eyes can be turned. Necessarily this is so because they must be screwed in and out, but by virtue of being able to turn the screw eyes, it is possible to push the stakes 3 into the ground at angles in case a stone should be in the way of the point of the stakes. For example, if the operator should push down on the stakes before he gets far enough into the ground to securely hold the gage bar and at that moment strikes a stone, he pulls the stake out a short distance, gives it a slight inclination by reason of being able to turn the screw eyes in which that stake is inserted, and again pushes that stake down, when he probably will find that the stone is avoided.

There may be occasions when it is desired to trim up close to the walk and not leave a beveled edge E as in Fig. 1. In that case, the screw eyes 6 are taken out of the side and screwed in the holes 7, made for the purpose at the extremities of the bar, whereupon the gage bar is affixed to the ground as in Fig. 2.

The operator now makes use of the downwardly tapering slot 5, chopping along the edge of the lawn in the narrow slit at the bottom, which is sufficiently wide to permit the cutting implement to pass. When the gage bar is used in this way, it becomes necessary to remove the bar before the portions along the edge of the walk can be actually removed, because obviously, the gage bar will be in the way and prevent the removal of said portions while it is in position.

It is of course preferable to use the outside beveled edges of the gage bar for the purpose of trimming the edge, as in Fig. 1, but it is recognized that aged persons might have occasion to use this device, and it is for their convenience that the tapering slot 5 is provided. The wide portion of the slot makes it easy to insert the cutting implement even if the hand that wields the implement is unsteady.

Consider now the improved cutting implement. The blade 2, already spoken of, is preferably of the shape shown, with the widely diverging cutting edges 8 at the bottom. The blade has a tang 9, which is inserted in the end of the staff 10 and secured by a pin 11.

A bore 12 in the upper end of the staff, receives the reduced portion 13 of the striker 14, which may be wholly or partially made of iron. The manner of use of the implement is clear. The blade 2 is run along the beveled edge of the gage bar, and when in proper position, the striker 14 is lifted and thrust into the bore 12, imparting a smart blow to the staff 10, which is sufficient to drive the blade 2 across and cut off that portion of the turf.

Consider next the form of the invention in Figs. 5, 6 and 7. This implement is capable of being used without the gage bar 1. It is of substantially U-shape in cross section as in Fig. 7, consisting of the metallic body 15, with the cutting edge 16 on one side and suitable edge guides 17 on the other. The body is mounted on the lower end of the handle 18.

In use, the guides 17 are thrust into the ground adjacent to the edge of the walk W, a chopping or cutting motion being performed by the operator. The blade 16 thereby cuts a line along the lawn a short distance from the edge of the walk, the intervening portion of turf being cut out and removed by a side motion of the implement.

It is to be observed that the edges of the guides 17 are slightly beveled or bent outwardly, as at 19. This provision is for the purpose of causing that side of the body next to the edge of the walk, to closely engage that edge, this action occurring by virtue of the pressure of the earth inside of the tool toward the guides. In other words, as the tool is moved along, the beveled portions 19 tend to cause the implement to move inwardly toward the edge of the walk and thus cut a line a uniform distance all around.

This tool is of particular value in cutting around circular walks, the gage bar 1 in Fig. 1 not being well adapted for this particular use. A hook 20 on the front end of the tool 15 in Fig. 5, can also be used in removing that intervening portion of the turf between the line cut by the blade 16 and the edge of the walk.

Saw teeth 21 can be provided on the cutting blade 16, as in Fig. 6, if desired. In either case, the manner of operation of the cutting implement is the same.

The modification of the turf cutter in Fig. 8 consists in providing the pilot or guide $2^b$, which is disposed a suitable distance from the blade $2^a$ at one extremity of the staff or handle $10^a$. The guide $2^b$ is to be run along the edge of the walk for the purpose of cutting off uniform portions of the turf, in the event that it be desired not to use the gage bar illustrated in Fig. 1.

A further modification of the gage bar is shown in Fig. 9. Instead of making the gage bar of a single piece, a plurality of sections of triangular tubing $1^a$, $1^b$ and $1^c$ are employed. These are successively smaller so that they telescope one within the other. They are pulled out to the length desired, any suitable stop means being provided to keep the sections from pulling apart altogether. Screw eyes $6^a$ on the respective sections, are for the purpose of receiving the fastening stakes.

While the construction and arrangement of the improved edge trimming guide as herein described and claimed, is that of a generally preferred form, obviously modifications and changes may be made without departing from the spirit of the invention or the scope of the claims.

I claim:—

1. A cutting implement used in connection with a lawn edge trimming gage, comprising a blade, a staff to which it is affixed and which has a bore, and a weighted driving member operative in said bore.

2. A cutting implement, comprising a blade with widely diverging cutting edges, and a tang; a staff receiving the tang which is secured thereon, and including a bore; and an impacting member comprising a weighted handle with a reduced portion operable in said bore.

3. A cutting implement, comprising a staff, with cutting means including a blade, and guide means spaced therefrom, enabling the accurate placing of the blade in respect to the edge of a walk.

4. A lawn edge trimming implement, comprising a handled cutting blade, and guide means, independently affixed to the handle and spaced parallel to the blade to provide a sod cutting space.

5. A cutting implement, comprising a blade, a staff on which it is secured, including a bore; an impacting member comprising a weighted handle operable in said bore; and a suitably affixed and disposed guide spaced from the blade.

JOSEPH LEES.